(12) United States Patent
Griffin et al.

(10) Patent No.: US 7,636,821 B2
(45) Date of Patent: Dec. 22, 2009

(54) ASYNCHRONOUS HYBRID MIRRORING SYSTEM

(75) Inventors: Kevin Curtis Griffin, Rochester, MN (US); Scott Dennis Helt, Rochester, MN (US); Michael James McDermott, Oronoco, MN (US); Glen W. Nelson, Rochester, MN (US); Mark Philip Piazza, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 10/758,484

(22) Filed: Jan. 15, 2004

(65) Prior Publication Data

US 2005/0160242 A1 Jul. 21, 2005

(51) Int. Cl.
G06F 12/16 (2006.01)
(52) U.S. Cl. ...................................... 711/162
(58) Field of Classification Search .................. 711/162
See application file for complete search history.

(56) References Cited

U.S. PATENT DOCUMENTS

| | | | | |
|---|---|---|---|---|
| 5,592,618 A | * | 1/1997 | Micka et al. | 714/54 |
| 5,937,414 A | * | 8/1999 | Souder et al. | 707/203 |
| 6,487,645 B1 | * | 11/2002 | Clark et al. | 711/162 |
| 6,549,992 B1 | * | 4/2003 | Armangau et al. | 711/162 |
| 6,647,473 B1 | * | 11/2003 | Golds et al. | 711/161 |
| 7,296,125 B2 | * | 11/2007 | Ohran | 711/162 |
| 2004/0210563 A1 | * | 10/2004 | Zait et al. | 707/3 |
| 2004/0250029 A1 | * | 12/2004 | Ji et al. | 711/162 |
| 2004/0268067 A1 | * | 12/2004 | Yamagami | 711/159 |
| 2005/0021565 A1 | * | 1/2005 | Kapoor et al. | 707/200 |
| 2005/0091391 A1 | * | 4/2005 | Burton et al. | 709/230 |

OTHER PUBLICATIONS

"Efficient Management of Remote Disk Subsystem Data Duplexing," IBM Technical Disclosure Bulletin, vol. 39, Issue 1, pp. 49-52, Jan. 2009. ACC No. NN960149.*

* cited by examiner

*Primary Examiner*—Shane M Thomas
(74) *Attorney, Agent, or Firm*—Wood, Herron & Evans, LLP (57) ABSTRACT

A method backs up computer data by organizing update requests into groups. All update requests in one group complete concurrently before requests of a subsequent group complete.

34 Claims, 4 Drawing Sheets

ASYNCHRONOUS HYBRID MIRRORING SYSTEM

FIELD OF THE INVENTION

The invention generally relates to computer systems, and in particular, to the storage of data in such systems.

BACKGROUND OF THE INVENTION

Most businesses rely on computer systems to store, process and display information that is constantly subject to change. Unfortunately, computers on occasion partially or completely lose their ability to function properly during a crash, or failure. Computer failures have numerous causes, such as power loss, component damage or disconnect, software failure, or interrupt conflict. Such computer failures can be very costly to a business. In many instances, the success or failure of important transactions turn on the availability of accurate and current information. For example, the viability of a shipping company can depend in large part on its computers' ability to track inventory and orders. Banking regulations and practices require money venders to take steps to ensure the accuracy and protection of their computer data. Accordingly, businesses worldwide recognize the commercial value of their data and seek reliable, cost-effective ways to protect the information stored on their computer systems.

One practice used to protect critical data involves data mirroring. Specifically, the mass memory of a backup computer system is made to mirror the memory of a primary computer system. That is, the same updates made to the data on the primary system are made to the backup system. For instance, write requests executed in the memory of the primary computer system are also transmitted to the backup computer system for execution in the backup memory. Under ideal circumstances, and in the event that the primary computer system crashes, the user becomes connected to the backup computer system through the network and continues operation at the same point using the backup computer data. Thus, the user can theoretically access the same files through the backup computer system on the backup mass memory as the user could previously access in the primary system.

There are two basic mirroring approaches for backing up data. Synchronous mirroring involves updating data on the backup computer in the same order as the data updates on the primary computer. Put another way, synchronous mirroring works on the principle that a next update will not be attempted on the primary or backup computer until the previous update has completed on the backup computer. This synchronous technique preserves the order of the updates. That is, all of the updates at the backup system necessarily complete in sequential order. The updated data must be sequentially ordered on the backup computer before it can be used.

As an example of using synchronous mirroring, if a primary node must accomplish three updates, the first of these three updates is sent to the backup node as it issues on the primary computer. The second update of the three will not issue at either the primary or the backup computer until the previously received update has been accomplished at the backup computer. Likewise, the third, subsequent update will not issue at either computer until the second update has executed at the backup computer. As such, the synchronous mirroring approach provides good data integrity. That is, the data on the backup computer should track the primary data updates at nearly any potential point of failure.

Despite the good data integrity, however, a disadvantage to synchronous mirroring includes poor system performance. For instance, it can take a relatively long period of time for a particular update on the backup system to complete in proper order. For instance, the update request may have to be routed to a device that is external to the primary computer, and may even be geographically remote. Consequently, subsequent updates on the primary and backup systems are delayed. Over time, the ordered requirement of synchronous mirroring can thus result in unacceptable delays that adversely affect system performance.

Another mirroring approach, asynchronous mirroring, provides improved performance by issuing updates at the backup node without regard to order. That is, a backup computer in asynchronous mirroring attempts to process all received updates in parallel. The update requests are processed when received and while other requests are processing. The backup computer later quiesces, or puts in proper, sequential order, the updates after the application stops running. The main advantage of asynchronous over synchronous mirroring, which continuously orders each update, is that the parallel processing greatly reduces delay times.

For instance, using the example of the three update requests from above, all three requests may be processed concurrently, or generally within the same window of time and without regard to order. Under one scenario as a consequence, the first and third updates may finish before the second update is processed and completed. The parallel processing of the updates allows for faster updates at the backup system.

Despite the improved processing times provided by asynchronous mirroring, however, data at the backup system generally has less integrity than is accomplished using synchronous mirroring. For instance, should the primary node crash before the second or first update completes, then some of the updates provided to the backup computer will be sequentially out of order, and consequently, unusable.

The inefficiency and unreliability of these existing mirroring techniques become exacerbated in a clustered computer environment. Clustered systems include computers, or nodes, that are networked together to cooperatively perform computer tasks. A primary computer of the clustered system has connectivity with a resource, such as a disk, tape or other storage unit, a printer or other imaging device, or another type of switchable hardware component or system. Clustering is often used to increase overall performance, since multiple nodes can process in parallel a larger number of tasks or other data updates than a single computer otherwise could. The increased number of updates places a larger burden on the clustered computer system to efficiently and accurately backup data.

Because of increased computing demands, as well as the inefficiency of synchronous mirroring and the unreliability of asynchronous mirroring, a significant need exists in the art for an improved manner of updating data at a backup computer system.

SUMMARY OF THE INVENTION

The invention addresses these and other problems associated with the prior art by providing an apparatus, program product and method for efficiently and reliably mirroring data of a primary system to a backup system. In one respect, processes consistent with the invention provide a hybrid approach that enjoys benefits of both the fast processing of asynchronous mirroring and the data integrity of synchronous mirroring. More particularly, a number of update requests are organized into groups at both the primary and backup systems. The respective groups are processed synchronously to preserve sequential ordering. The updates of each group, however, are processed concurrently, or substantially at the same time and without regard to order. This allows improved processing times with regard to the requests of each group.

Put another way, the requests of a first group are processed concurrently before a subsequent request issues. This feature maintains data integrity and sequential ordering. As such, all update requests in one group complete before a request of a subsequent group issues and completes. Concurrent issuance of the requests in each group allows relatively quick processing. The sequential, ordered processing of the respective groups provides relatively good data integrity.

In certain embodiments of the invention, an operating system executing program code present on at least one of the primary and backup systems categorizes incoming requests according to a group number. Update requests assigned the same group number will issue concurrently after all requests of a preceding group have completed. As such, subsequently created group numbers may be incremented automatically to maintain chronology and desired, sequential ordering.

Memory accessible to the operating system of either or both the primary and backup systems may track a status that is indicative of whether a group is currently active or in progress. An active group status may cause a newly received request to be properly associated with the current group for processing considerations. Conversely, an inactive status may prompt the creation of a new group. The memory may also maintain and allow updating of a count indicative of how many outstanding requests remain in a group. Such a count is helpful in regulating the creation and ordered execution of respective groups.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
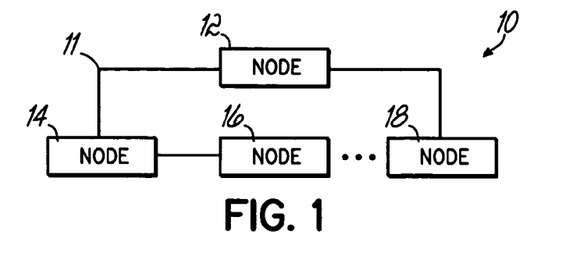
FIG. 1 is a block diagram of a clustered computer system consistent with the invention.

Turning now to the Drawings, wherein like numbers denote like parts throughout several views, FIG. 1 illustrates an exemplary clustered computer system 10 configured to mirror data from a primary node 12 to one or more backup nodes 14, 16, and/or 18. Namely, the system 10 backs up computer data executed at the primary node 12 by organizing update requests into groups at the backup nodes 14, 16, and/or 18. All update requests in one group complete concurrently before requests of a subsequent group complete. That is, the groups execute synchronously, while the requests of each group execute concurrently. An embodiment of the invention assigns outstanding updates to groups such that the target can perform all updates in a group in any order. In this manner, updates are performed asynchronously and partially in parallel providing better performance. The system 10 thus enjoys relatively quick processing in addition to relatively good data integrity.

As shown in FIG. 1, the plurality or nodes 12, 14, 16 and 18 are interconnected with one another via a network of interconnections 11. Individual nodes 12, 14, 16 and 18 may be physically located in close proximity with other nodes, or computers, or may be geographically separated from other nodes, e.g., over a wide area network (WAN), as is well known in the art. State data held by each node 12, 14, 16 and 18 in the system 10 may be data that indicates whether that node is the primary member, the order of backup, e.g., first backup, second backup, etc., and the resources that a primary member needs in order to be active, e.g., necessary files, IP addresses, disks units, etc.

In the context of the clustered computer system 10, at least some computer tasks are performed cooperatively by multiple nodes executing cooperative computer processes (referred to herein as "jobs") that are capable of communicating with one another using cluster infrastructure software. Jobs need not necessarily operate on a common task, but are typically capable of communicating with one another during execution. In the illustrated embodiments, jobs communicate with one another through the use of ordered messages. A portion of such messages are referred to herein as requests, or update requests. Such a request typically comprises a data string that includes header data containing address and identifying data, as well as data packets.

Any number of network topologies commonly utilized in clustered computer systems may be used in a manner that is consistent with the invention. That is, while FIG. 1 shows a clustered computer system 10, one skilled in the art will appreciate that the underlying principles of the present invention apply to computer systems other than the illustrated system 10. It will be further appreciated that nomenclature other than that specifically used herein to describe the handling of computer tasks by a clustered computer system using cluster infrastructure software may be used in other environments. Therefore, the invention should not be limited to the particular nomenclature used herein, e.g., as to protocols, requests, members, groups, messages, jobs, etc.

Figure 2:
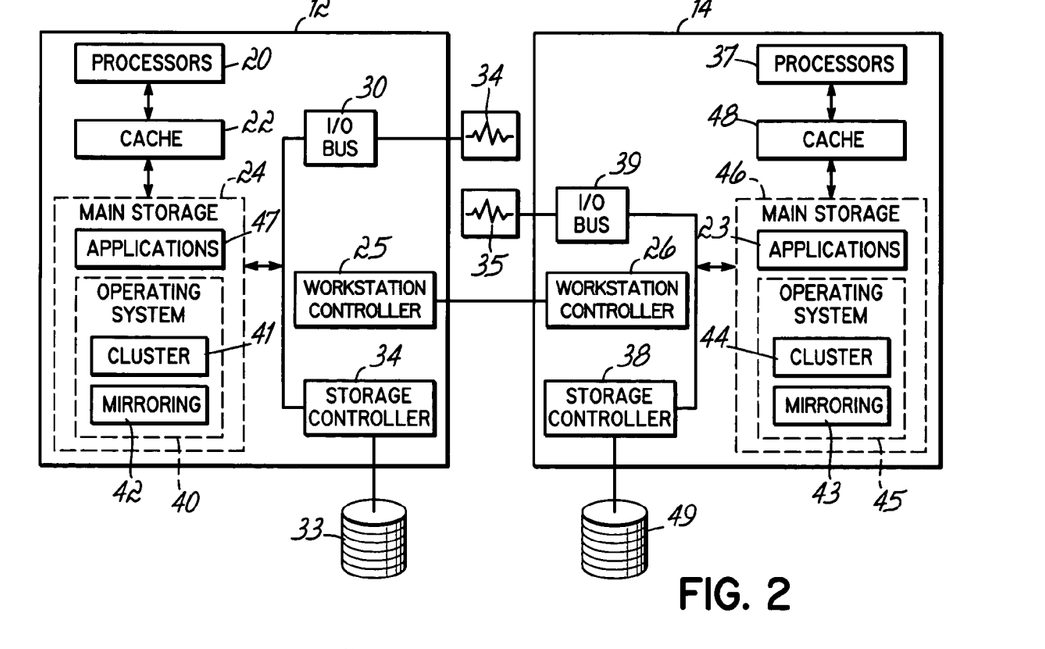
FIG. 2 is a block diagram of a primary and backup node in the clustered computer system of FIG. 1.

Now turning to FIG. 2, exemplary hardware configurations for primary and backup nodes 12 and 14 in clustered computer system 10 are shown. Node 12 generically represents, for example, any of a number of multi-user computers such as a network server, a midrange computer, a mainframe computer, etc. As such, the terms "node," "system" and "computer" are sometimes used interchangeably throughout this specification. In any case, it should be appreciated that the invention may be implemented in other computers and data processing systems, e.g., in stand-alone or single-user computers such as workstations, desktop computers, portable computers, and the like, or in other programmable electronic devices (e.g., incorporating embedded controllers and the like).

Node 12 generally includes one or more system processors 20 coupled to a main storage 24 through one or more levels of cache memory disposed within a cache system 22. Furthermore, main storage 24 is coupled to a number of types of external devices via a system input/output (I/O) bus 30 and a plurality of interface devices, e.g., a workstation controller 25 and a storage controller 34, which respectively provide external access to one or more external networks (e.g., a cluster network interconnection), one or more workstations 14, and/or one or more storage devices such as a direct access storage device (DASD) 33. Any number of alternate computer architectures may be used in the alternative.

To implement an apparatus, program product and method for mirroring data consistent with the invention, update request processing functionality may be implemented within cluster infrastructure software implemented in each node. For example, node 12 is illustrated as having resident in main storage 24 an operating system 40 implementing cluster infrastructure software 41 and mirroring program code 42. In one exemplary embodiment, nodes 12 and 14 are implemented as iSeries computers from International Business Machines Corporation, and operating system 40 is implemented as an appropriate operating system incorporating clustering capabilities. The general use and configuration of clustering services in the exemplary environment is well known to one of ordinary skills in the art.

One or more jobs or applications 47 are also illustrated in node 12, each having access to features implemented within the cluster infrastructure software 41 and mirroring program code 42. It will be appreciated, however, that the functionality or features described herein may be implemented in other layers of software in node 12, and that the functionality may be allocated among other programs, computers or components in clustered computer system 10. Therefore, the invention is not limited to the specific software implementation described herein.

As shown in FIG. 2, the backup node 14 may include many of the same or similar components as included in the primary node 12. Namely, the backup node 14 may include: a work station controller 26, a storage controller 38, processors 37, mirroring program 43, cluster program 44, operating system 45, main storage 46 and cache memory 48.

The discussion hereinafter will focus on the specific routines utilized to mirror data in a manner consistent with the present invention. The routines executed to implement the embodiments of the invention, whether implemented as part of an operating system or a specific application, component, program, object, module or sequence of instructions, will also be referred to herein as "computer programs," "program code," or simply "programs." The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and nonvolatile memory devices, floppy and other removable disks, hard disk drives, optical disks (e.g., CD-ROM's, DVD's, etc.), among others, and transmission type media such as digital and analog communication links.

It will be appreciated that various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Moreover, those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

Figure 3:
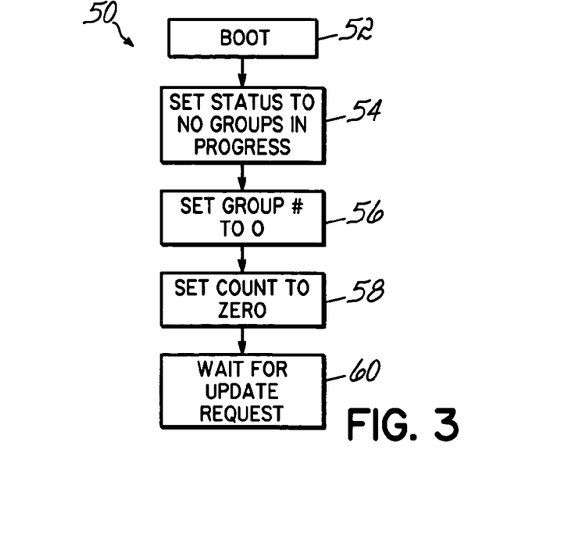
FIG. 3 is a flowchart illustrating exemplary initialization processes for both the primary and backup nodes of FIG. 2.

The flowchart 50 of FIG. 3 shows a sequence of exemplary steps associated with the initialization of either or both the primary and backup nodes 12 and 14, respectively, of FIGS. 1 and 2. Initialization processes may begin in response to a computer 12 being booted or the mirroring function 42 of the system 10 being enabled, for instance. The initialization processes set memory, registers, program settings and other conditions that facilitate mirroring functions consistent with the invention.

Turning more particularly to the flowchart 50 of FIG. 3, the system 10 boots the mirroring function 42 at block 52. Such processes at block 52 may include, for instance, the operating system 40 of the primary node 12 checking communication paths and requisite permissions. The status of either or both nodes 12, 14 is set to "no group in progress" at block 54. Setting the status may include activating a software control flag in memory accessible to the operating system 40. As will become clear after a full reading of the specification, designating the status as such causes the next received update request to be associated with a new group. That is, a request received while no group is in progress may cause a new group number to be assigned to the request. The assigned group number determines whether the update request is processed without delay and in parallel with other requests having the same group number, or whether it is alternatively held until the update requests of an earlier group complete.

To this end, a group number setting at block 56 is zeroed. The zeroed, initial setting of block 56 ensures that the current group numbers as between the nodes 12 and 14 remain synchronized, and that the first request received will be assigned to group number one. This group number setting is used to discern between different groups of update requests and for other organizational purposes. As with the status setting of block 54, the group number setting of block 56 may be accomplished and updated in a register or other accessible memory. Similarly, a count indicative of the number of uncompleted, or outstanding requests currently held in a group is zeroed at block 58 for both nodes 12 and 14. Where desired, the count may be kept in memory 24 accessible to the operating system 40.

With such settings and other initialization processes established, an update request is awaited by both nodes 12 and 14 at block 60. As discussed herein, such a request may include a request to update stored data, such as an inventory list, for example. For the primary node 12, the update request may originate at an application 47. The backup node 14 receives a respective update request from the mirroring function 42 of the primary node 12.

Figure 4:
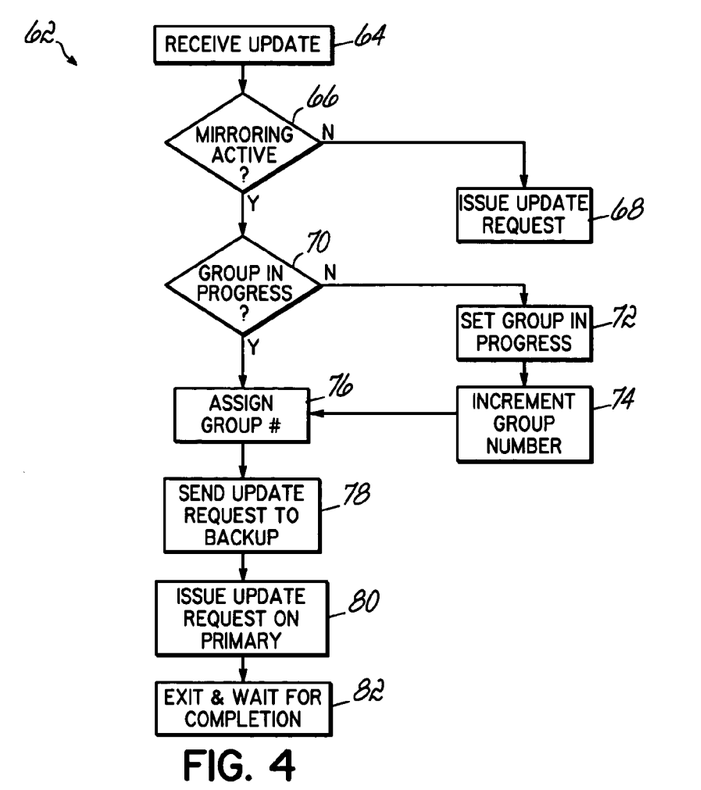
FIG. 4 is a flowchart illustrating exemplary actions taken by the primary node of FIG. 2 in response to receiving an update request.

The flowchart 62 of FIG. 4 shows an exemplary sequence of actions taken by the primary node 12 of FIGS. 1 and 2 in response to receiving such an update request. Turning more particularly to the processes of the flowchart 62, the operating system 40 of the primary node 12 detects at block 64 an update request originating from an application 47. The operating system 40 checks to see if mirroring processes consistent with the invention are active at block 66. That is, an embodiment of the present invention may allow mirroring processes to be selectively turned on and off. Should the mirroring processes be inactive at block 66, then other backup processes may be used at block 68 to process the update on the primary node.

Where mirroring processes consistent with the principles of the present invention are alternatively active at block 66, the operating system 40 checks to see if a group is in progress on the primary system 12 at block 70. For instance, the operating system 40 may determine if a status control flag in memory 24 corresponding to an active group is indicated. An active group status may occur when a request has preceded the current request, and the group associated with that previous request includes uncompleted requests.

Where no group is in progress at block 70, the status of the applicable memory may be set to "group in progress" at block 72. Such may be the case for a first update request, or where the previous requests of an earlier group have all completed. Setting the status to group in progress may prevent a next occurring request from inadvertently causing the creation of a new group. Following the setting at block 72, the group number stored in memory 24 may be incremented at block 74. This incrementing effectively causes a new group to be created. For instance, following the initialization processes of FIG. 3, the group number, which was set to zero, will be incremented to one at block 74. This new group number is then assigned to the update request at block 76.

Where there is already a group in progress at block 70 of FIG. 4, the current group number of the primary node 12 is retrieved from memory 24 and assigned to the update request at block 76. An update request may then be generated and sent to the backup node 14 at block 78.

An update request may issue on the primary 12 system at block 80. Issuance of the update request at block 80 initiates completion of the update on the primary node 12. The mirroring function 42 of the primary node 12 then waits at block 82 for the completion of the update out to disk, for example.

Figure 5:
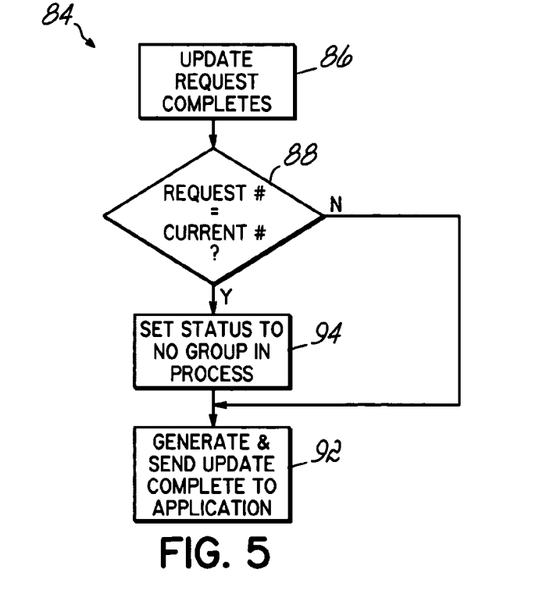
FIG. 5 is a flowchart illustrating exemplary actions taken by the primary node of FIG. 2 in response to an update request completing on the primary node.

FIG. 5 shows the actions taken by the primary node 12 after the update request completes on the primary node 12. The steps of the flowchart 84 of FIG. 5 additionally occur after the backup node 14 has received, but not completed, the update request sent from the primary node 12 at block 78 of FIG. 4.

More particularly, after an update request completes on the primary node 12 at block 86 of FIG. 5 (and the request has been received at the backup node 14), the primary node 12 determines if the completed request had the same group number assigned to it as the current group number stored in memory 24 of the primary node 12. If determined not to match by the primary node 12 at block 88, then the operating system 40 of the primary node 12 sends an update complete message back to the application 47 at block 92. The update complete communication tells the application 47 it can send another update request. The application 47 waits for this communication before issuing another such request. Of note, the update complete communication is sent without the status of the group being changed. Thus, the next request from the application 47 at the primary node 12 may not start a new group.

Alternatively at block 88, if the update request has the same group number as the current group number stored at the primary node 12, then the group status in memory 24 is set to "no group in progress" at block 94. As shown in FIG. 5, an update complete communication is generated at block 92. This communication may prompt the application 47 to generate a new request. Due to the setting accomplished at block 94 of FIG. 5, that new request will be received at block 64 of FIG. 4 and will cause a new group to be formed at block 72 of FIG. 4.

As such, a second request received from the same application may cause a new group to be formed, effectively closing out a group. In the meantime, multiple requests from other applications may be received, that is, before the new request from the same application is received. Thus, multiple requests may be received before a new group is created. As a consequence of the group in progress setting at block 94, those preceding update requests from the other applications will be assigned the same, current group number. Thus, it is not uncommon to have ten or so update requests included in a current group. In that scenario, all ten requests would issue concurrently prior to a subsequent update request's issuance.

Figure 6:
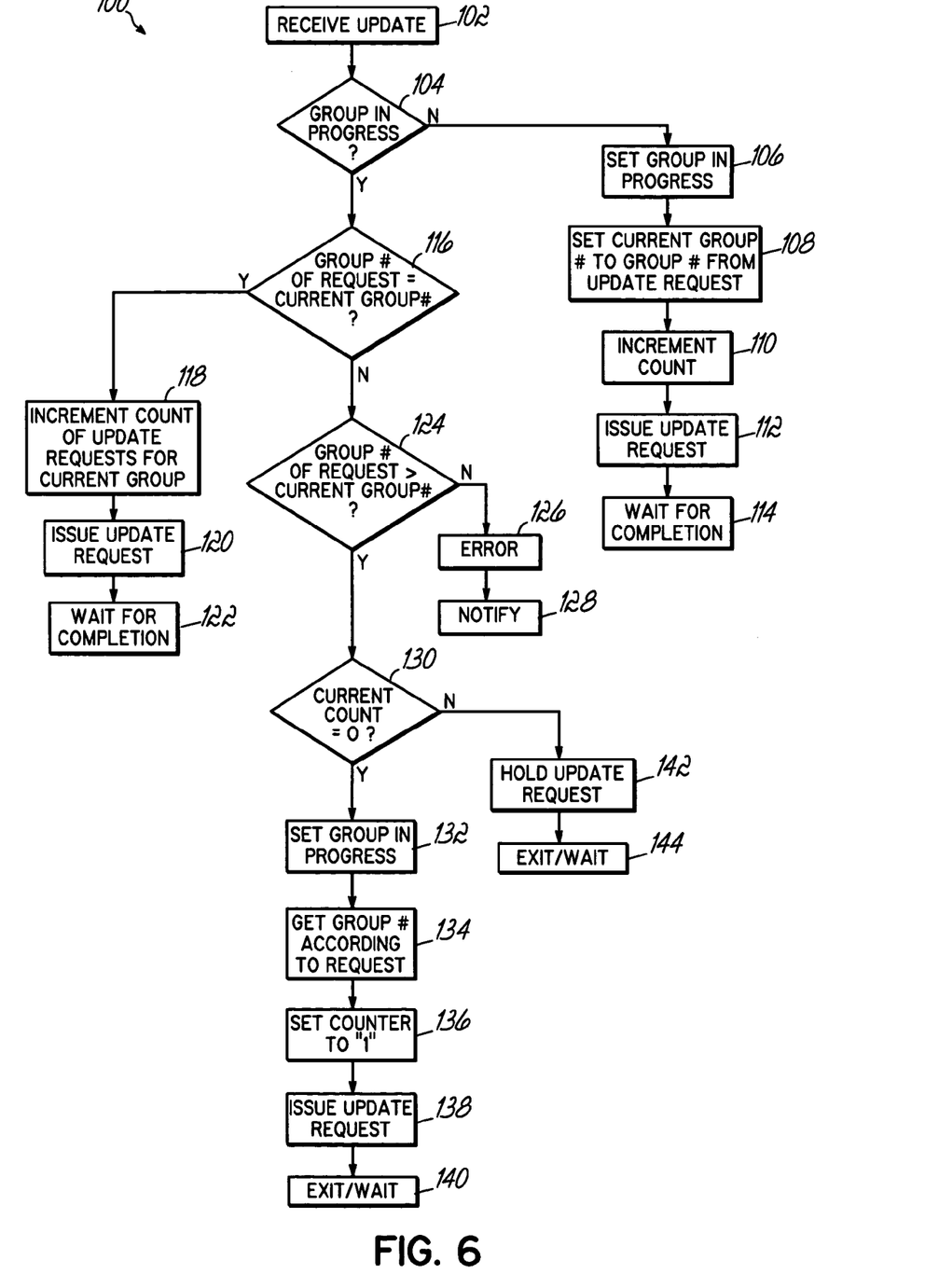
FIG. 6 is a flowchart illustrating exemplary actions taken by the backup node of FIG. 2 in response to receiving an update request from the primary node.

FIG. 6 shows a flowchart 100 having exemplary sequence steps suited for execution by a backup node 14 receiving an update request. Such an update request is typically received from the mirroring function 42 at block 102 of FIG. 6. The operating system 45 of the backup node 14 determines at block 104 whether a group is in progress. Where no group is determined to be in progress at block 104, the operating system 45 will set the group in progress at block 106. This action prevents another group from being started.

At block 108, the operating system 45 sets the current group number stored within memory 46 of the backup node 14 to a group number read from the update request. As discussed herein, the request may include header information identifying a destination and the type of update, as well data packets. As such, the backup node 14 knows the current group number.

The count is incremented at block 110. The count indicates how many outstanding updates exist in a current group. For instance, after the initialization processes of FIG. 3, the count would be incremented from zero to one to reflect the presence of the new request. The update request then issues at block 112, and the operating system 45 of the backup node 14 waits for an update request to complete at block 114.

Alternatively, should a group be in progress at block 104, it is determined whether the group number of the request is the same as the group number stored within the memory 46 of the backup node 14 at block 116. If the group numbers are the same at block 116, then the count of the update is incremented at block 118. Again, the new count indicates how many uncompleted updates are in the current group, to include the new request.

An update request is issued at block 120 of FIG. 6. This issued request causes the update to be accomplished at the backup node 14. Of note, the request may be processed concurrently with any other requests in the current group, that is, within nearly the same period of time and without particular regard to order. At block 122 of FIG. 6, the backup node 14 waits for completion of an update request.

Where the group number of the request is alternatively not the same as the current group number stored on the backup node 14 at block 116, the operating system 45 verifies at block 124 that the group number of the update request is greater than the current group number stored on the backup node 14. Otherwise, an error is generated at block 126 that indicates a defect in the mirroring function. An appropriate notification is generated and sent at block 128.

If the current group count stored on the backup node 14 is determined to be zero at block 130 of FIG. 6, then the status of the backup node 14 may be set to "group in progress" in response to the update request. A new group is started at block 134. The new group may have a group number determined from the update request received from the primary node 12. In response to the new group at block 132, the count of the outstanding update in the group may be set to one at block 136. An update request may issue at block 138, and the backup node 14 may wait for this update request to complete at block 140 of FIG. 6.

Where the current count is not equal to zero at block 130 of FIG. 6, the operating system 45 of the backup node 14 may put a hold on the update request at block 142. Thus, the update request may be cached or otherwise held in a queue while the backup node 14 waits for the update of the previous group to complete at block 144. As discussed herein, the update request assigned to a new group will not be processed until all the requests of the prior group have issued on the backup node 14. As such, the backup node 14 stores, or holds the request without processing it.

Figure 7:
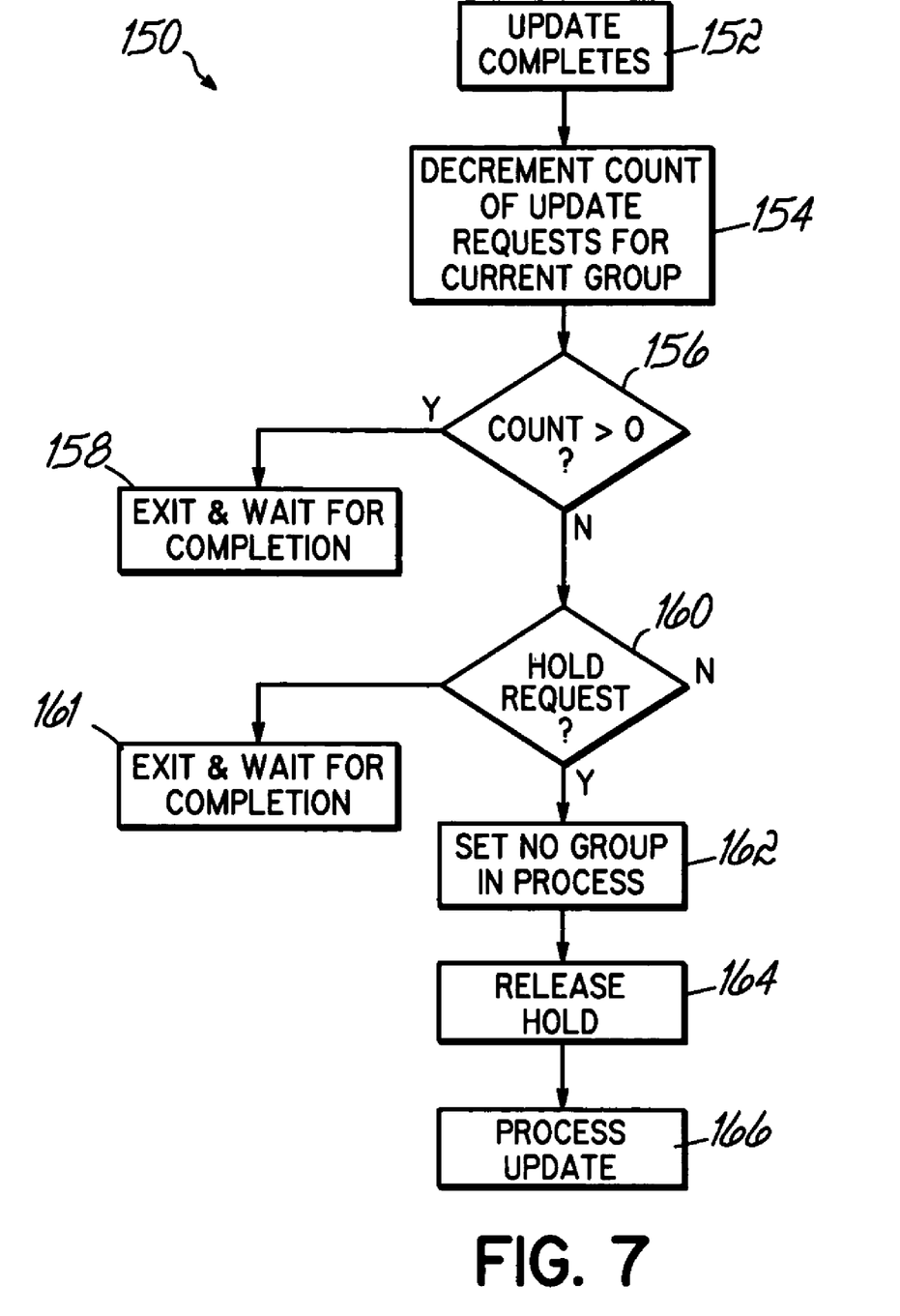
FIG. 7 is a flowchart illustrating exemplary actions taken by the backup node of FIG. 2 in response to an update request completing on the backup node.

FIG. 7 shows a flowchart 150 having exemplary steps suited for execution by the backup node 14 when an update request completes on the backup node 14. Turning more particularly to the flowchart 150, an update request is determined to have been completed at block 152. In response to the update request completing at block 152, the operating system 45 of the backup node 14 decrements the count of outstanding requests for the current group at block 154. If the backup node 14 determines that the count is greater than zero, then there are still uncompleted requests in the current group. Consequently, the backup node 14 will exit and wait at block 158. That is, the system 10 will not issue another update request until all outstanding requests of the current group have completed.

If the count is alternatively zero at block 156 of FIG. 7, then there are no outstanding requests in the current group. It is then determined by the operating system 45 if one or more requests are being held in another group at block 160. Such a holding action may be initiated at block 142 of FIG. 6, for instance. Where an update request is not being held at block 160 of FIG. 7, the mirroring function 43 of the backup node 14 exits and waits for more updates at block 161. Where one or more requests are alternatively being held at block 160, then the operating system 45 may set the status of the backup node 14 to no group in progress at block 162.

The backup node 14 then releases its hold on the request at block 164. This action at block 164 causes the backup node 14 to treat the released request(s) at block 166 of FIG. 7 as a new received update, as discussed in the text describing the processes of FIG. 6.

While the present invention has been illustrated by a description of various embodiments and while these embodiments have been described in considerable detail, it is not the intention of the applicants to restrict, or in any way limit, the scope of the appended claims to such detail. For instance, any of the steps of the above exemplary flowcharts may be deleted, augmented, made to be simultaneous with another or be otherwise altered in accordance with the principles of the present invention.

Furthermore, while computer systems consistent with the principles of the present invention may include virtually any number of networked computers, and while communication between those computers in the context of the present invention may be facilitated by clustered configuration, one skilled in the art will nonetheless appreciate that the processes of the present invention may also apply to direct communication between only two systems as in the above example, or even to the internal processes of a single computer, or processing system. Additionally, one skilled in the art will appreciate that the actions of checking of group in progress, setting group in progress or not in progress, and setting the current group number are all serialized on the primary node 12. Similarly, the same applicable steps are serialized on the backup node 14, in addition to the actions of incrementing and decrementing the current group count. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method for updating data at a backup system that tracks updates made to a primary system, the method comprising:

in response to receiving a first update request from an application, creating a first group including a first plurality of update requests, the first plurality of update requests including the first update request;

in response to receiving a second update request from the application prior to ending the formation of the first plurality of update requests, creating a second group including a second plurality of update requests, the second plurality of update requests including the second update request, the first update request of the first plurality of update requests in the first group having an order dependency relative to the second update request of the second plurality of update requests in the second group, with the update requests in each of the first and second groups capable of being processed concurrently and without regard for order relative to one another;

concurrently completing the first plurality of update requests of the first group; and after concurrently completing the first plurality of update requests, concurrently completing the second plurality of update requests of the second group.

2. The method of claim 1, wherein creating the first group further includes creating a group that includes a plurality of requests initiated at a plurality of applications.

3. The method of claim 1, wherein creating the first group further includes updating a count associated with a number of the first plurality of update requests.

4. The method of claim 1, wherein creating the first group further includes updating a status indicative of whether the first group is active.

5. The method of claim 1, wherein creating the first group further includes assigning a group number to each update request of the first plurality of update requests.

6. The method of claim 1, wherein concurrently completing the first plurality of update requests further includes issuing an update request of the first plurality of update requests.

7. The method of claim 1, further comprising:
reading a group number from an update request.

8. The method of claim 1, wherein concurrently completing the first plurality of update requests further includes holding the second update request.

9. The method of claim 8, wherein concurrently completing the second plurality of update requests further includes releasing a hold on the second update request.

10. The method of claim 1, wherein creating the first group, creating the second group, concurrently completing the first plurality of update requests and concurrently completing the second plurality of update requests further comprises creating the first group, creating the second group, concurrently completing the first plurality of update requests and concurrently completing the second plurality of update requests on the primary system.

11. The method of claim 1, wherein creating the first group, creating the second group, concurrently completing the first plurality of update requests and concurrently completing the second plurality of update requests further comprises creating the first group, creating the second group, concurrently completing the first plurality of update requests and concurrently completing the second plurality of update requests on the backup system.

12. A method for updating data at a backup system that tracks updates made to a primary system, the method comprising:
synchronously processing a plurality of groups of update requests, a first update request from an application in a first group of update requests from among the plurality of groups having an order dependency relative to a second update request from the application in a second group of update requests from among the plurality of groups, with the update requests in each group being capable of being processed concurrently and without regard for order relative to one another, and wherein receipt of the second update request prior to ending the formation of the first group initiates the creation of the second group of update requests; and
asynchronously processing the update requests in each group.

13. The method of claim 12, wherein processing the plurality of update requests further includes holding the second update request of the second group from among the plurality of groups.

14. The method of claim 12, wherein processing the groups further includes assigning a group number to an update request of the plurality of update requests.

15. The method of claim 1, further comprising after completing the first plurality of update requests, arranging the second plurality of update requests according to the order dependency.

16. An apparatus comprising:
a processor; and
a recordable type media encoded with program code communicating with the processor and configured to update data at a backup system that tracks updates made to a primary system by creating a first group including a first plurality of update requests in response to receiving a first update request from an application, the first plurality of update requests including the first update request, the program code further configured to create a second group including a second plurality of update requests in response to receiving a second update request from the application prior to ending the formation of the first plurality of update requests, the second plurality of update requests including the second update request and the first update request of the first plurality of update requests in the first group having an order dependency relative to the second update request of the second plurality of update requests in the second group, with the update requests in each of the first and second groups capable of being processed concurrently and without regard for order relative to one another, the program code further configured to concurrently complete the first plurality of update requests of the first group and, after completing the first plurality of update requests, concurrently complete the second plurality of updates requests of the second group.

17. The apparatus of claim 16, wherein the recordable type media encoded with the program code resides on at least one of a backup system and a primary system, and the backup system is peripheral from the primary system.

18. The apparatus of claim 16, further comprising:
a memory accessible to the recordable type media encoded with the program code.

19. The apparatus of claim 16, wherein the recordable type media encoded with the program code resides on the primary system.

20. The apparatus of claim 16, wherein the recordable type media encoded with the program code resides on the backup system.

21. The apparatus of claim 16, wherein the program code is further configured to create a group that includes a plurality of requests initiated at a plurality of applications.

22. The apparatus of claim 16, wherein the program code is further configured to update a count associated with a number of the first plurality of update requests.

23. The apparatus of claim 16, wherein the program code is further configured to update a status indicative of whether the first group is active.

24. The apparatus of claim 16, wherein the program code is further configured to assign a group number to each update request of the first plurality of update requests.

25. The apparatus of claim 16, wherein the program code is further configured to issue an update request of the first plurality of update requests.

26. The apparatus of claim 16, wherein the program code is further configured to read a group number from an update request.

27. The apparatus of claim 16, wherein the program code is further configured to hold the second update request.

28. The apparatus of claim 27, wherein the program code is further configured to release a hold on the second update request.

29. The apparatus of claim 16, wherein the program code is further configured to create the first group, create the second group, complete the first plurality of update requests and complete the second plurality of update requests on the primary system.

30. The apparatus of claim 16, wherein the program code is further configured to create the first group, create the second group, concurrently complete the first plurality of update requests and concurrently complete the second plurality of update requests on the backup system.

31. The apparatus of claim 16, wherein the program code is further configured to, after completing of the first plurality of update requests, arrange the second plurality of update requests according to the order dependency.

32. An apparatus, comprising:
a processor; and
a recordable type media encoded with program code in communication with the processor and configured to update data at a backup system that tracks updates made to a primary system by synchronously processing a plurality of groups of update requests, a first update request from an application in a first group of update requests from among the plurality of groups having an order dependency relative to a second update request from the application in a second group of update requests from among the plurality of groups, with the update requests in each group being capable of being processed concurrently and without regard for order relative to one another and wherein receipt of the second update request prior to ending the formation of the first group initiates the creation of the second group of update requests, the program code further configured to asynchronously process the update requests in each group.

33. A program product, comprising:

program code in communication with at least one of a primary and backup system, the program code configured to create a first group including a first plurality of update requests in response to receiving a first update request from an application, the first plurality of update requests including the first update request, the program code further configured to create a second group including a second plurality of update requests in response to receiving a second update request from the application prior to ending the formation of the first plurality of update requests, the second plurality of update requests including the second update request and the first update request of the first plurality of update requests in the first group having an order dependency relative to the second update request of the second plurality of update requests in the second group, with the update requests in each of the first and second groups capable of being processed concurrently and without regard for order relative to one another, the program code further configured to concurrently complete the first plurality of update requests of the first group and, after completing the first plurality of update requests, concurrently complete the second plurality of updates requests of the second group; and a recordable type, signal bearing medium bearing the program code.

34. A program product, comprising:

program code in communication with at least one of a primary and backup system, the program code configured to update data at a backup system that tracks updates made to a primary system by synchronously processing a plurality of groups of update requests, a first update request from an application in a first group of update requests from among the plurality of groups having an order dependency relative to a second update request from the application in a second group of update requests from among the plurality of groups, with the update requests in each group being capable of being processed concurrently and without regard for order relative to one another and wherein receipt of the second update request prior to ending the formation of the first group initiates the creation of the second group of update requests, the program code further configured to asynchronously process the update requests in each group; and a recordable type, signal bearing medium bearing the program code.

* * * * *